J. SINGER.
Cooking Apparatus.
No. 40,773.
Patented Dec. 1, 1863.
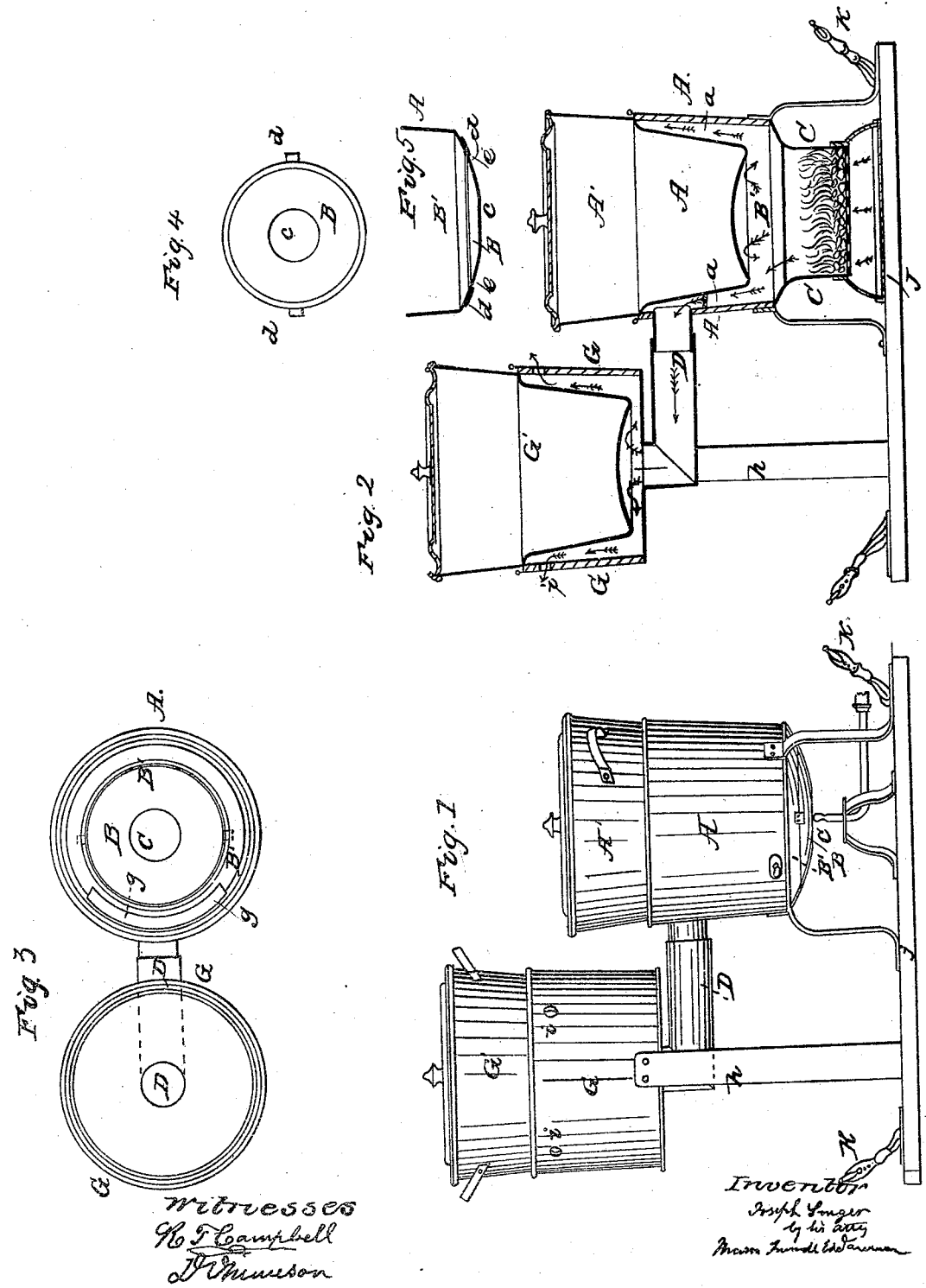

UNITED STATES PATENT OFFICE.

JOSEPH SINGER, OF CHICAGO, ILLINOIS.

IMPROVEMENT IN COOKING APPARATUS.

Specification forming part of Letters Patent No. 40,773, dated December 1, 1863.

*To all whom it may concern:*

Be it known that I, JOSEPH SINGER, of Chicago, county of Cook, and State of Illinois, have invented a new and Improved Portable Cooking Apparatus; and I do hereby declare that the following is a full, clear, and exact description thereof, reference being had to the accompanying drawings, making a part of this specification, in which—

Figure 1 is a side elevation of my portable cooking apparatus, arranged for the use of gas. Fig. 2 is a longitudinal vertical section through the apparatus, arranged for the use of charcoal-fire. Fig. 3 is a top view of the apparatus with the boilers removed. Fig. 4 is a top view of the removable bottom of the lower pot. Fig. 5 is a sectional view of the lowermost vessel, having the removable bottom of Fig. 4 applied to it.

Similar letters of reference indicate corresponding parts in the several figures.

This invention relates to an improved cooking apparatus, which will be found very useful and economical for cooking on a small scale, particularly during the summer season, when the heat of a fire is not required, except such as is absolutely necessary for preparing food, heating water, and other like purposes.

The object of my invention is, chiefly, to adapt a portable cooking apparatus, which is constructed for two boilers or pots, as will be hereinafter described, for receiving either the heat of a charcoal-furnace, the flame of a lamp, or the flame of gas, whichever may be most convenient; also, to so construct the apparatus that the boilers, which form a part thereof, will be more perfectly subjected to the heat, all as will be hereinafter described.

To enable others skilled in the art to make and use my invention, I will proceed to describe its construction and operation.

In the accompanying drawings, A represents a circular vessel, which may be made of any desired height and diameter. This vessel has an annular flange secured within it near its upper edge, upon which flange rests the shoulder of the pot or boiler A′, which has its lower portion reduced somewhat, for the purpose of leaving a space, $a$, around it when placed within the vessel A, as clearly shown in Fig. 2.

Below the annular flange, above referred to, a lining of plaster-of-paris, or some other suitable substance which is a good non-conductor of heat, is applied to the inside of the vessel A, and extends down to its bottom, for the purpose of retaining the heat, as far as possible, within this vessel. The top of the vessel A is closed by the flaring shoulder of the pot A′ when this pot rests on the annular flange; and surrounding that portion of the pot projecting below the flange is the space $a$, which receives the heat from the furnace, or flame of a lamp, or gas-burner, as the case may be, through an opening in the bottom of the vessel A. This opening should be very small when a lamp or gas-burner is used to heat the apparatus, and considerably larger when it is desired to employ a charcoal-furnace, and in order that the apparatus may be used for either a charcoal fire or a gas or lamp flame, I have applied a removable bottom, B, to the vessel A, which has a small opening, $c$, through its center, as shown in Figs. 3, 4, and 5. This bottom plate, B, is made convex, and it has two or more lips, $d\ d$, projecting from its circumference diametrically opposite each other, which projections are received by the fastenings $e\ e$ on that portion, B′, of the bottom of the vessel A which is secured to this vessel, so that by applying this removable plate B to the bottom B′ of the vessel, and giving it a slight turn, the lips $d\ d$ will be caught by the portions $e\ e$, and the plate B will be confined in place, as shown in Fig. 5. This plate B, having a small central opening through it, adapts the vessel A for a lamp or gas-burner, as it confines all the heat within the vessel A at the bottom thereof. By removing this bottom B a circular opening of greater diameter is left in the bottom of the vessel A, which opening should be of such a size as to receive the flaring upper edge of a charcoal-furnace, C, as shown in Fig. 2, which consists of a box having a perforated or grate bottom, mounted on legs of sufficient height to allow the circular flaring edge of the top of the box C to touch the edge of the annular flange B′, as shown in Fig. 2. Thus it will be seen that the heat rising from the charcoal-fire in the furnace C will all be carried by the upward draft into the vessel A and around the pot A′.

To insure a circulation of the heated products of combustion around the pot A′, I have affixed a flange, $g$, to the inside of the vessel A, which extends partially around this vessel just below the escape-flue D. This flange *g* checks the direct upward draft to this flue, and causes the heated air to pass around the pot A' before it can escape through the flue D. The flange *g* should be of sufficient width to tough the side of the pot A', otherwise some of the heated air will escape between it and the pot.

G represents a vessel which is mounted on legs *h h*, that elevate it so that its bottom is nearly on a level with the top of the vessel A. The object of thus elevating this vessel G is to enable me to conduct the heated products of combustion from the top of the vessel A through flue D into the bottom of this elevated vessel G without in any manner retarding or obstructing the upward draft. The vessel G is lined inside with plaster-of-paris, or some other non-conductor of heat, and this vessel has an annular flange for supporting the pot G', arranged and applied as described for the lower vessel, A. The pot G' is in all respects like the pot A', and these pots are both constructed of thin metal, so that their contents will heat readily. The bottoms of the pots are made concave, as shown in Fig. 2, for the purpose of concentrating and retaining, as much as possible, the heat under these pots. The openings which are made around the vessel G, near its top, as shown at *i i*, Figs. 1 and 2, are for the purpose of creating a draft through the apparatus and for allowing the heated air to escape therefrom, as indicated by the arrows in Fig. 2. The two heating-vessels A and G are mounted on legs which elevate them the proper height and admit of a lamp, a gas-burner, or a charcoal-furnace, being introduced under the lowermost vessel, A, and removed at pleasure. The stand J, to which the legs of the two vessels A G are secured, is furnished with handles *k k*, which are used for moving the apparatus about from one place to another.

From this description it will be seen that my improved portable cooking apparatus is constructed with a view to convenience and cleanliness in its use. The two vessels A and G being arranged as described, the heated air will pass directly from the lower vessel into the bottom of the upper vessel, through a very short flue, and finally escape from the upper part of this elevated vessel. The boiler or pot A' is subjected to the direct heat of the furnace-fire, or the lamp or gas flame, whichever may be used, and this pot, like the pot G', forms the flue-spaces around which the heated air circulates. The lining of the two vessels A G with plaster-of-paris prevents a rapid radiation of heat from these vessels. The apparatus may therefore be used on a table without experiencing any disagreeable heat therefrom.

When it is not desired to use a charcoal-fire, the circular perforated plate is applied to the bottom of the vessel A, as above described, and a lamp or gas-burner may be used for heating the pots. In either case the proper draft through the apparatus is obtained by regulating the size of the opening through the bottom of the lowermost vessel, as above stated. The pots A' G' being both removable, their contents can be readily poured out, and the whole apparatus can be conveniently cleaned.

Having thus described my invention, what I claim as new, and desire to secure by Letters Patent, is—

1. Adapting the lowermost vessel, A, for receiving the heat of a lamp or gas-burner, or of a charcoal-furnace, by means of a perforated removable bottom plate, B, applied to the perforated bottom B' of said vessel, substantially as described.

2. The portable cooking apparatus, constructed, arranged, and operating substantially as described.

JOSEPH SINGER.

Witnesses:
ERNST PRUSSING,
NICOLAS FABER.